United States Patent Office 3,631,224
Patented Dec. 28, 1971

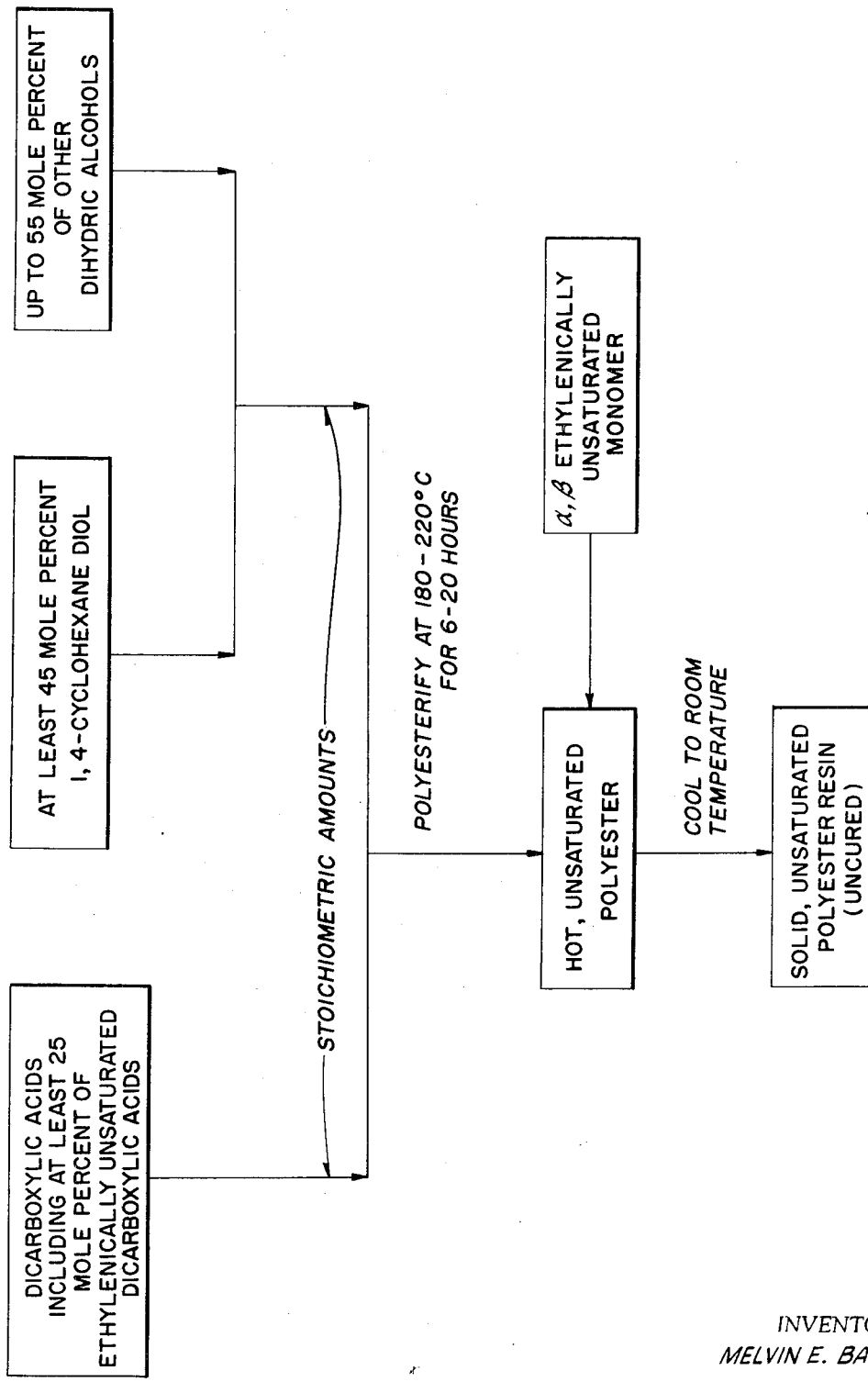

3,631,224
UNSATURATED POLYESTER RESIN MOLDING POWDER
Melvin E. Baum, Monroeville, Pa., assignor to Koppers Company, Inc.
Continuation-in-part of application Ser. No. 690,935, Dec. 15, 1967. This application June 25, 1970, Ser. No. 49,780
Int. Cl. C08f 21/00, 21/02
U.S. Cl. 260—861         6 Claims

ABSTRACT OF THE DISCLOSURE

An unsaturated polyester resin which is a solid capable of being ground into a free flowing powder at room temperature comprises a mixture of an $\alpha,\beta$-ethylenically unsaturated monomer and a condensation polymer formed by esterifying a dicarboxylic acid, at least a portion of which contains ethylenic unsaturation, with a dihydric alcohol wherein at least a portion of the dihydric alcohol comprises 1,4-cyclohexane diol.

REFERENCE TO RELATED APPLICATION

This application in a continuation-in-part of copending application Ser. No. 690,935, filed Dec. 15, 1967.

BACKGROUND OF THE INVENTION

Unsaturated polyester resins, which comprise a mixture of an ethylenically unsaturated copolymerizable monomer and a condensation polymer formed by polyesterifying dicarboxylic acids at least a portion of which contains ethylenic unsaturation with dihydric alcohols, can be cured to form thermosetting products which have uses in industry. These resins are particularly useful when glass fibers are dispersed therein as reinforcement. Pipes, panels and the like can be formed from such reinforced thermosetting resins. Although high molecular weight condensation polymers can be formed which are solids at room temperature, the addition of the copolymerizable monomer such as tyrene to the polyester results in a liquid solution; the unsaturated monomer acting as a solvent for the condensation polymer. While it is possible to cross link an unsaturated polyester molecule with another unsaturated polyester molecule, this is in reality seldom if ever done in commercial practice because of the cost difference between the polyester and the monomer as well as the ease of copolymerizing the unsaturated condensation polymer-monomer mixtures which have enhanced reactivity over the polyester alone. Therefore, the use of unsaturated polyester resins (polyester condensate dissolved in cross linking solvent monomer) in certain applications such as, for example, in molding applications has been somewhat curtailed by the unavailability of the condensation polymer-monomer mixture as dry powders such as are available in other plastic resins such as phenolics or the like. As a result polyester resins have not been utilized in certain molding techniques and other techniques have had to be modified to allow the use of a liquid.

Quite surprisingly, it has now been discovered that a polyester resin can be formed which is a solid at room temperature and therefore, can be ground into a free flowing powder or the like. In accordance with the invention, 1,4-cyclohexane diol is used in forming the initial condensation polymer or unsaturated polyester. The resulting unsaturated polyester is dissolved while still hot in up to 50% by weight ethylenically unsaturated monomer and when cooled to room temperature, the result is a solid (yet uncured) polyester resin solution which can be ground into a free-flowing powder or pelletized. The solid polyester resin can be used in molding applications, fluid bed coating techniques, or in impregnation of glass mats.

SUMMARY OF THE INVENTION

In accordance with the invention, an uncured unsaturated polyester resin which is a solid at room temperature comprises:
 (a) 30 to 50% by weight of an $\alpha,\beta$-ethylenically unsaturated monomer;
 (b) 50 to 70% by weight of a condensation polymer formed by esterifying approximately stoichiometric amounts of:
  (1) a dihydric alcohol at least 45 mole percent of which is 1,4-cyclohexane diol;
  (2) a dicarboxylic acid or anhydride at least a portion of which is an ethylenically unsaturated dicarboxylic acid, or anhdride.

DESCRIPTION OF THE DRAWING

The drawing is a flow-sheet which illustrates schematically the invention which is described in detail below.

DETAILED DESCRIPTION

Unsaturated polyester resins are well known in the art (see, for example, U.S. Pat. 2,255,313, issued to Carleton Ellis). The unsaturated polyester portion is a condensation polymer formed by polyesterifying dicarboxylic acids or anhydrides with dihydric alcohols. The term "unsaturated polyester" as used herein is defined as the condensation polymer produced by condensing dicarboxylic acid or its anhydride with the dihydric alcohol in approximately equimolar proportions and wherein at least a portion of which the dicarboxylic compound contains ethylenic unsaturation. The term "unsaturated polyester resin" as used herein is meant to define the combination of:
 (a) The condensation polymer or unsaturated polyester defined above; and
 (b) An $\alpha,\beta$-ethylenically unsaturated copolymerizable monomer such as styrene which can be copolymerized with the unsaturated polyester.

To provide unsaturation within the polyester, at least about 25 mole percent of the total dicarboxylic acids or anhydrides must contain ethylenic unsaturation. Examples of such unsaturated dicarboxylic acids include maelic, fumaric, itaconic, aconitic, mesaconic, citraconic, as well as maleic anhydride. The remainder of the dicarboxylic acids (up to about 75 mole percent) is either a hexacarboxylic dicarboxylic acid or anhydride such as for example: phthalic acid, tetrahydrophthalic acid, hexahydrophthalic acid, isophthalic acid, trans-1,4-cyclohexanes dicarboxylic acid, 1,4- or 1,5- or 2,6- or 2,7-naphthalene dicarboxylic acid; and endo-cis-bicyclo (2.2.1)-5-heptene-2,3-dicarboxylic acid, as well as the anhydrides of any of the foregoing which are capable of existence, also an alkanedioic acid or its anhydride such as, for example, succinic acid, glutaric acid, adipic acid, and the like may be used as the remainder of the dicarboxylic acid.

The dicarboxylic acids are polyesterified with approximately equimolar amounts of dihydric alcohols. In accordance with the invention, at least 45 mole percent (based on total moles of dihydric alcohol) of the dihydric alcohol is 1,4-cyclohexane diol. Lesser amounts result in the formation of a polyester which forms a liquid solution with cross linking monomer.

The remainder of the dihydric alcohols can be any of the commonly used alkane diols or oxy alkane diols such as ethylene glycol, propylene glycol, diethylene glycol, dipropylene glycol, 1,3-butane diol, neopentyl glycol or the like as well as other saturated cyclic dihydric alcohols such as 1,4-cyclohexane dimethanol, hydrogenated bisphenol A or the like as well as mixtures of the foregoing.

The polyester is prepared by polyesterifying the ingredients as described above in accordance with the well-known procedures for producing condensation resins such as, for example, described in the Carleton Ellis patent previously referred to. The polyesters may be produced by either the so-called fusion or the solvent process. Gelation inhibitors such as hydroquinone can be used as well as esterification catalysts to accelerate the condensation.

The molecular weight of the polyester is conveniently measured by the acid number of the polyester. This measurement is based on milliequivalents of KOH necessary to neutralize 1 gram of the polyester. For example, when the esterification is carried out by the so-called fusion process, the esterification is carried out under an inert blanket of gas such as nitrogen in a temperature range of about 180–220° C. for a period of 6–20 hours until an acid number below 100 and preferably below 50 is obtained. Esterification catalysts can be used as well as gelation inhibitors such as are well known in the art.

While the foregoing has described the formation of the condensation polymer portion of the invention as a single condensation, it is to be understood that the condensation polymer or polyester portion of the invention can also be formed by mixing together more than one polyester. For example, a polyester made by condensing 1,4-cyclohexane diol with maleic anhydride in equimolar proportions can be hot blended with a second polyester made by condensing propylene glycol with maleic anhydride in equimolar proportions. However, regardless of the manner in which the polyester is formed, the resultant mixture must contain at least about 45 mole percent of 1,4-cyclohexane diol based on the total moles of dihydric alcohol used.

The hot liquid polyester or mixture of polyesters is then dissolved into an α,β-ethylenically unsaturated monomer. The monomer acts both as a solvent for the polyester and as a subsequent copolymerization agent. Examples of such α,β-ethylenically unsaturated monomers include the vinyl type such as styrene, alpha methyl styrene, vinyl toluene, divinyl benzene, chlorostyrene, vinyl acetate, vinyl-2-chlorethyl ether, N-vinyl pyrolidone, and 2-vinyl pyridine. Also acrylic type cross linking monomers are suitable in the practice of the invention. Examples include methylmethacrylate, methylacrylate and acrylonitrile. In addition, allyl derivatives are suitable cross linking monomers. Examples include diallyl phthalate, diallyl fumerate and allyl diglycol carbonate. The resultant mixture is then cooled to room temperature. As the solution cools, it solidifies, and the solid can be then ground or broken into pellets. The amount of this monomer may vary. However, at least 10–20% of monomer (by total weight of the resin) must be used to afford a sufficient amount for the subsequent copolymerization or curing of the resin. Greater amounts, however, up to about 60% can be used and are economically attractive to use. Preferably, about 30 to 50% by weight monomer is used to insure that the mixture when cooled to room temperature will be a solid.

By the expression solid solution in this invention is meant the physical condition of the polyester resin at room temperature, after the polyester condensate has been dissolved in the cross linking monomer, while hot, and the resulting solution has been cooled to room temperature.

It should be noted at this time, that in determining whether a resin will be a solid or a liquid two parameters must be considered. One parameter is the mole percentage of 1,4-cyclohexane diol moiety based on total moles of diol which is present in the polyester condensate. The other parameter is the percent by weight based on total resin weight of cross-linking solvent monomer which is present and is used to dissolve the polyester condensate. As the mole percentage of 1,4-cyclohexane diol decreases and as the percent by weight of cross linking solvent monomer increases there is a tendency to form a liquid solution. It has been found that at the extreme lower limit of the 1,4-cyclohexane diol concentration (45 mole percent), the amount of cross linking monomer used should be less than the upper limit (50% by weight) specified by the invention in order to form a solid solution. Conversely when the cross linking monomer concentration is at the upper limit specified by the invention (50% by weight) the concentration of 1,4-cyclohexane diol should be greater than the lower limit (45 mole percent) in order to form a solid solution. For example, as shown in Table III infra, when the mole percentage based on total mole of diol of 1,4-cyclohexane diol is 44%, a polyester dissolved in styrene solution containing 50% by weight based on total resin weight styrene is a liquid, whereas a 30% by weight styrene solution is a solid. However, as also shown in Table III infra when the 1,4-cyclohexane diol concentration is increased to 50 mole percent, the resulting condensate can be dissolved in 50% styrene monomer and a solid solution results.

No such considerations of liquids versus solids are normally encountered in the prior art because the prior art polyester monomer mixtures are liquids at room temperature when even only 10–20% monomer is used (the minimum considered necessary to effect adequate copolymerization). However, since the novel polyester resin of the invention provides solid resin which may be used in applications not previously contemplated or feasible for liquid polyester resins, the use of lesser amounts of monomer in certain formulations so as to obtain a solid resin, is preferred.

The resins may have fillers such as calcium carbonate, talc or the like added thereto as well as coloring agents. Other additives such as fire-retardant additives and the like can also be incorporated into the resin, particularly if they are solids which can be ground up and physically dispersed into the powder mixture.

The subsequent copolymerization or curing of the polyester resin is usually initiated by a free-radical generating catalyst such as, for example, a peroxide catalyst; although, other free-radical generating means such as, for example, UV light or radiation can also be used. Examples of such free-radical generating catalysts include benzoyl peroxide, cumene hydroperoxide, methyl ethyl ketone peroxide and the like. Other free-radical generating catalysts which can also be used include, for example, 2,2-azobisisobutyronitrile. Polymerization accelerators such as cobalt naphthenate, dimethyl aniline or the like may also be used in conjunction with the above catalysts.

Some of the above catalysts such as, for example, methyl ethyl ketone peroxide are active at room temperature while others such as, for example, benzoyl peroxide are not active at temperatures below about 60–70° C. Because the invention contemplates that heat can be used during the subsequent copolymerization to melt the solid polyester resin powder back into a liquid, this temperature differential may well influence the selection of the particular catalyst. If a high temperature catalyst, such as, for example, benzoyl peroxide is used, it could be ground up and added to the powdered polyester resin mixture and the mixture shipped with the catalyst already incorporated therein. This is not the normal practice when liquid polyester resins are used because room temperature catalyst would affect the curing, immediately and even high temperature catalyst if placed in the liquid polyester resin would initiate premature curing. Therefore, separate packaging of catalysts is usually the practice. With the novel polyester resin of the invention, such can be eliminated and the catalyst incorporated directly into the mixture thus providing one component system which can be directly chraged into a mold press and, on application of heat to melt the powder, cured into a thermoset molded object.

Other non-conventional techniques can also be practiced with the solid resin having a dry solid catalyst physically mixed therewith. For example, the catalyst-containing polyester resin powder could be dispersed in a volatile solvent such as acetone or the like just prior to curing. The solvent action of the acetone would bring the resin and catalyst into reactive contact with one another to initiate the copolymerization. The exothermic heat of curing would then drive off the solvent. The solid polyester resin-dry catalyst-physical mixture could also be mixed into a liquid polyester resin just prior to cure to provide a thioxotropic mixture. The dry catalyst upon being wetted out by the liquid polyester resin would then initiate cure of the entire resin mixture.

The invention will be more easily understood by referring to the following examples and the attached flow sheet.

Example I

Into a reaction vessel, equipped with thermometer, stirrer, reflux condenser, and inert gas inlet tubes was addded 2 moles of 1,4-cyclohexane diol and 2 moles of maleic anhydride. The reaction mass was heated, with constant stirring, until a temperature of 220° C. was reached. The water of esterification was removed by a stream of nitrogen gas bubbling through the reactants in the reaction vessel. The heating was continued for 7 hours until an acid number of 13 was reached. Thereupon the hot resin was cut with sufficient styrene to provide a 70% by weight polyester, 30% by weight monomer solution. Upon cooling to room temperature, the resin solution was a white solid. This solid was ground to a fine powder and mixed with 2% by weight of a ground benzoyl peroxide catalyst. The mixture was charged to a mold cavity in a press and heated to 135° C. for 1 hour to cure the resin. The cured product was a hard, tough, clear casting.

Example II

To illustrate the difference in result when other dihydric alcohol are used having similar, but not the identical, structures to 1,4-cyclohexane diol a number of polyesters were prepared by esterifying 1 mole of dihydric alcohol with 1 mole of maleic anhydride under the conditions described in Example I. In each case, the polyester was esterified to an acid number below 50. Each polyester was then dissolved into styrene to a 70% by weight polymer, 30% by weight monomer ratio. After allowing the mixtures to cool to room temperature, each was examined. The results are tabulated below.

TABLE I.—PHYSICAL STATE OF VARIOUS POLYESTER RESINS IN WHICH THE DIOL MOIETY IS VARIED

| Dihydric alcohol in polyester | Percent monomer based on total weight | Physical state resin at room temperatures |
|---|---|---|
| 1,4-cyclohexane diol | 30 | Solid. |
| 1,3-cyclohexane diol | 30 | Liquid. |
| 1,2-cyclohexane diol | 30 | Do. |
| 2,2'-di(4-hydroxyethoxy phenyl) propane (bishydroxy ethyl ether of bis-phenol A) | 30 | Do. |

The results show the difference when other dihydric alcohols are substituted for 1,4-cyclohexane diol as well as the criticality of the monomer percent content and illustrate the unobviousness of the discovery.

Example III

In order to show, the range of cross linking solvent monomer, which can be used to dissolve the polyester condensate, to form a solid solution, polyester condensates were prepared according to Example I and dissolved in 30, 40, 50 and 60% by weight based on total resin weight of styrene monomer. The polyester was dissolved hot in the styrene and then cooled to room temperature. The physical state of the solution is reported in Table II below.

TABLE II

Physical state of 1,4-cyclohexane diol polyesters dissolved in styrene monomer

| Weight percent styrene based on total total resin weight: | Physical state of resin at room temperature |
|---|---|
| 30 | Solid. |
| 40 | Do. |
| 50 | Do. |
| 60 | Liquid-solid. |

Thus the above Table II shows a solid solution is formed when the cross linking solvent monomer concentration is within the range of 30 to 50% by weight based on total resin weight. At 60% by weight there is a liquid-solid.

Example IV

In order to show the range of 1,4-cyclohexane diol which can be used to form a solid solution the following experiment was conducted. A 1,4-cyclohexane diol condensate prepared as in Example I. The polyester was hot blended with another polyester condensate which is sold commercially by Koppers Company, Inc. as Koplac 3700 (propylene glycol-maleic anhydride condensate, 1.1/1 mole ratio, acid number about 30). The weight ratios of the blends of Koplac 3700/1,4-cyclohexane diol-maleic anhydride polyester were 30/70, 40/60, 50/50, and 60/40. These blends had respectively 65, 55, 44 and 38 mole percent 1,4-cyclohexane diol based on total moles of diol. The hot blended resin was then a diluted with styrene while still hot to form solutions and cooled to room temperature. The weight ratio of polyester to styrene in the solutions was 70/30, 60/40 and 50/50. The physical condition of the solutions is shown in Table III below.

TABLE III

TABLE III.—PHYSICAL STATE OF VARIOUS 1,4-CYCLOHEXANE DIOL POLYESTER, IN WHICH THE MOLE PERCENTAGE OF 1,4-CYCLOHEXANE DIOL VARIES, DISSOLVED IN VARIOUS AMOUNTS OF CROSS LINKING MONOMER

| Weight ratio Koplac 3700 to 1,4-cyclohexane diol polyester | Mole percent [1] | Weight ratio polyester/ styrene | Physical state of resin |
|---|---|---|---|
| 30/70 | 65 | 70/30 | Solid. |
| 30/70 | 65 | 60/40 | Do. |
| 30/70 | 65 | 50/50 | Do. |
| 40/60 | 55 | 70/30 | Do. |
| 40/60 | 55 | 60/40 | Do. |
| 40/60 | 55 | 50/50 | Do. |
| 50/50 | 44 | 70/30 | Do. |
| 50/50 | 44 | 50/50 | Liquid. |
| 60/40 | 38 | 70/30 | Do. |
| 60/40 | 38 | 60/40 | Do. |
| 60/40 | 38 | 50/50 | Do. |

[1] 1,4-cyclohexane diol in polyester based on total moles of diol.

Thus, from Table III, it can be seen that the lower limit of 1,4-cyclohexane diol which can be used in the polyester to form the solid solution is 44%. Below 44 mole percent all solutions are liquid. It should be noted that at 44 mole percent one should be careful of how much solvent monomer is used. As the Table III shows, at 50 weight percent solvent monomer a liquid solution is formed. However at 30 weight percent styrene a solid solution is formed.

Thus, the invention provides an unsaturated polyester resin which is a solid solution at room temperature. This solid unsaturated polyester resin solution can be ground into fine particles to provide a molding powder which can be used for molding articles in a molding press or the like. The novel solid polyester resin solution when ground into fine particles can be physically mixed with dry catalyst powder to form a one-package mixture which will readily cure upon application of heat to melt the powder. Thus, the novel polyester resin of the invention can be utilized in applications where the previous liquid unsaturated polyester resin could not be used.

What is claimed is:

1. An uncured unsaturated polyester resin which is a solid, free-flowing powder at room temperature comprising:
    (a) 30 to 50% by weight based on total resin weight of an $\alpha,\beta$-ethylenically unsaturated monomer; and
    (b) 50 to 70% by weight based on total resin weight of a condensation polymer formed by esterifying approximately stoichiometric amounts of:
        (i) a dihydric alcohol, at least 45 mole percent, based on total moles of dihydric alcohol, of which is 1,4-cyclohexane diol; with
        (ii) a dicarboxylic acid or anhydride at least 25 mole percent, based on total moles of dicarboxylic acid, of which is an ethylenically unsaturated dicarboxylic acid or anhydride.

2. The polyester resin of claim 1 wherein the unsaturated dicarboxylic acid or anhydride is selected from the class consisting of maleic acid, maleic anhydride, and fumaric acid.

3. The polyester resin of claim 2 wherein the remainder of said dicarboxylic acid or anhydride is selected from the class consisting of phthalic acid, tetrahydro phthalic acid, hexahydro phthalic acid, isophthalic acid, endocis-bicyclo 2.2.1)-5-heptene-2,3-dicarboxylic acid, succinic acid, glutaric acid, and adipic acid, and their anhydrides.

4. The polyester resin of claim 1 wherein the dihydric alcohols comprise 1,4-cyclohexane diol and a second dihydric alcohol selected from the class consisting of ethylene glycol, diethylene glycol, propylene glycol, dipropylene glycol, 1,3-butane diol, neopentyl glycol, 1,4-cyclohexane dimethanol, and hydrogenated bis-phenol A and mixtures of the foregoing.

5. The polyester resin of claim 1 wherein the $\alpha,\beta$-ethylenically unsaturated monomer is selected from the class consisting of styrene, alpha-methyl styrene, vinyl toluene, divinyl benzene, chlorostyrene, diallyl phthalate, and methyl methacrylate and mixtures of the foregoing.

6. An unsaturated polyester resin which is a solid at room temperature comprising:
    (a) about 30 to 50% by weight based on total resin weight of an $\alpha,\beta$-ethylenically unsaturated monomer; and
    (b) about 50 to 70% weight based on total resin weight of a condensation polymer formed by esterifying approximately stoichiometric amounts of:
        (i) 1,4-cyclohexane diol; with
        (ii) an unsaturated dicarboxylic acid selected from the class consisting of maleic anhydride, maleic acid, and fumaric acid.

References Cited
UNITED STATES PATENTS

| | | | |
|---|---|---|---|
| 2,598,663 | 6/1952 | Kropa | 260—870 X |
| 2,598,664 | 6/1952 | Kropa | 260—870 X |
| 3,294,620 | 12/1966 | Petropoulos et al. | 260—861 X |
| 3,345,339 | 10/1967 | Parker et al. | 260—861 X |

WILLIAM H. SHORT, Primary Examiner

E. A. NIELSEN, Assistant Examiner

U.S. Cl. X.R.

260—75 VA, 863, 864